Oct. 3, 1961     A. STRAUB     3,002,423
CINEMATOGRAPHIC PROJECTOR
Filed April 22, 1957

INVENTOR
Albert Straub
BY Michael S. Striker

United States Patent Office 3,002,423
Patented Oct. 3, 1961

3,002,423
CINEMATOGRAPHIC PROJECTOR
Albert Straub, Stuttgart-Bad Cannstatt, Germany, assignor to Eugen Bauer G.m.b.H., Stuttgart-Unterturkheim, Germany
Filed Apr. 22, 1957, Ser. No. 654,279
Claims priority, application Germany Apr. 26, 1956
8 Claims. (Cl. 88—17)

The present invention relates to film projectors used for the projection of cinematographic film.

At the present time manufacturers of such projectors must make a great number of models of a given film projector. The reason for this is that where the film projector is driven by a synchronous motor which rotates at a constant speed depending upon the frequency of the power supply, the projector will be operated at different speeds in different countries having different frequencies of power supply so that it is necessary at the present time to manufacture the projectors so that they will operate properly with the different power supplies. Also, where a projector is used for televising film similar difficulties arise because of different scanning frequencies which are used in different countries. Thus, for television purposes also it is necessary for manufacturers to make several different models. Not only is the cost of manufacturing increased by the necessity of so many different models, but in addition the ordering of the projectors is complicated, a considerable amount of storage space is required for the many different models, and the shipping of the models also is complicated by the great number of different models.

One of the objects of the present invention is to provide a projector which may be used under all of the above different operating conditions simply by making adjustments in the projector itself or by exchanging part of the projector structure for a corresponding part of a different size.

Another object of the present invention is to provide a projector which may be used with different scanning frequencies simply by making an adjustment in the projector itself with but a simple exchange of one claw moving part for another claw moving part.

A further object of the present invention is to provide structure capable of accomplishing the above objects and composed of simple and ruggedly constructed elements which are very reliable in operation.

With the above objects in view, the present invention mainly consists in a film projector which includes a shutter drive shaft means, a claw drive shaft means, and an adjustable motion transmitting means interconnecting the two drive shaft means for driving the same at predetermined speed relationships with respect to each other depending upon the setting of the adjustable transmission means. A driving motor of substantially constant speed is operatively connected to one of these means for driving the series of means. With this arrangement it is possible to provide predetermined relationships between the shutter speed and claw speed which will make it possible for a single projector to be used with different scanning frequencies for television purposes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
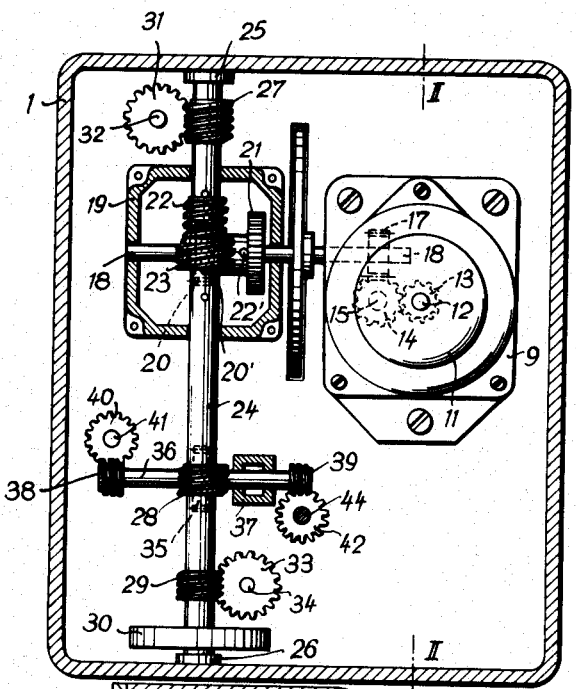
FIG. 1 is a sectional elevational view of a projector according to the present invention, a rear wall of the projector being eliminated from FIG. 1 to show the structure behind this rear wall.
Figure 2:
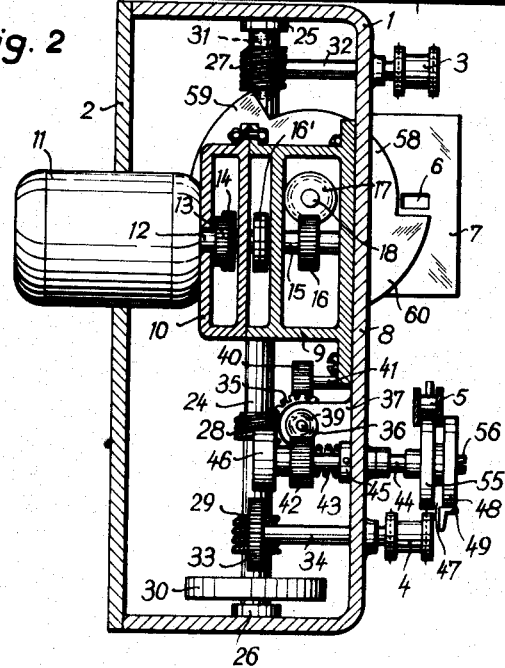
FIG. 2 is a sectional elevational view taken along line II—II of FIG. 1.

Referring to FIGS. 1 and 2, the projector includes a hollow housing 1 which is capable of being closed by a rear wall 2. At the front side of the projector is located the means required for moving the film, and FIG. 2 shows a transporting roll 3 for moving the film from a supply spool, a transporting roll 4 for moving the film to a takeup spool, and a claw 5 which is illustrated in section in FIG. 2. The film is projected through the exposure aperture 6 which is carried by a film door 7. For the purpose of clearly illustrating the structure the claw 5 is shown distant from the exposure aperture 6, although in the actual construction the claw 5 is actually located in the vicinity of the exposure aperture 6.

A housing 9 is fixed to the inner face of the front wall 8 of the housing 1, and a carrier structure 10 is connected by screws or the like to the housing 9, this carrier structure 10 having a flange which abuts against a flange of the housing 9. The carrier structure 10 carries at a rear part thereof a driving motor 11 which is in the form of a synchronous motor whose speed of operation depends upon the frequency of the power supply. The driving motor 11 extends through an opening formed in the rear wall 2 of the projector.

The carrier structure 10 is hollow and houses in its interior a gear 13 fixed to the drive shaft 12 of the motor, and within the carrier structure 10 there is also located a gear 14 which meshes with the gear 13. The gear 14 is fixed to a shaft 15 which is rotatably carried by the housing part 9, and this shaft 15 is divided into two parts which are coaxial with each other and which are rotatable together because of a clutch 16' having its clutch members respectively connected to the two parts of the shaft 15. Thus, the gear 14 is on a part of the shaft 15 which extends through a wall of the carrier structure 10 and which carries beyond this wall one part of the clutch 16', while the other part of the clutch 16' is carried by the other part of the shaft 15 which is rotatably carried by the housing part 9. The clutch 16' may be in the form of a simple friction clutch which is automatically engaged when the carrier structure 10 is connected to the housing part 9.

The shaft 15 fixedly carries a helical gear 16 which meshes with another helical gear 17 so as to provide an angle drive, and the gear 17 is fixed to a shaft 18 which is the shutter drive shaft and to which the shutter is connected for rotation with the shaft 18.

The shutter drive shaft 18 is perpendicular to the shaft 15 and is parallel to the front wall 8 of the projector, and this shutter drive shaft 18 has a portion rotatably carried by the housing 9 and another portion which is rotatably carried by a pair of opposed walls of another housing 19 which is fixed to the inner face of the wall 8 as by being screwed to the latter. Thus, as is apparent from FIG. 1, the shaft 18 extends across the interior of the housing 19, and within the housing 19 the shaft 18 carries a pair of interconnected change gears 20 and 21. These gears 20 and 21 are of different diameters and are fixed to each other for axial movement together along the shaft 18, these gears being compelled to rotate with the shaft 18 as by having a splined connection therewith, for example.

Another pair of change gears 22 and 23 are located in the housing 19 and are connected to each other for movement together, and this second pair of change gears are arranged for cooperation with the change gears 20 and 21. The change gears 22 and 23 are axially shiftable along an intermediate shaft 24 and are compelled to rotate with the latter as by having a suitable splined connection thereto, for example. A plurality of cross pins 20', 22' extend through the shafts 18 and 24 so as to maintain the change gears in predetermined axial positions on the shafts. It will be noted that the shaft 24 also extends turnably through a pair of opposed walls of the housing 19, and the upper end of the shaft 24 is connected by a bearing 25 to the top wall of the projector while the lower end of the shaft 24 is connected by a bearing 26 to the bottom wall of the projector. The gears 20—23 are helical gears and the diameters are such that the gear 20 can mesh with the gear 23, as shown in FIG. 1, or the change gears may be shifted so that the gear 21 will mesh with the gear 22. At the exterior of the housing 19 and within the housing 1 the intermediate shaft 24 fixedly carries helical gears 27, 28 and 29 which rotate with the intermediate shaft 24. Furthermore, adjacent its bottom end the shaft 24 carries a flywheel 30.

The helical gear 27 meshes with another helical gear 31 which is fixed to a shaft 32 which is turnably carried by and which extends through the front wall 8 of the projector. This shaft 32 carries at the exterior of the projector the film transporting roll 3, as is indicated in FIG. 2. The helical gear 29 meshes with a helical gear 33 fixed to a shaft 34 which extends through and is turnably carried by the wall 8 of the housing 1, and at the exterior of the housing the shaft 34 fixedly carries the film transporting roll 4. The helical gear 28 meshes with another helical gear 35 which is mounted on a second auxiliary or intermediate shaft 36 which is rotatably supported by a bearing block 37 fixed to the wall 8 of the housing 1, and the shaft 36 has fixed to its left end a helical pinion 38 which meshes with a helical gear 40. This gear 40 is fixed to a shaft 41 which at the exterior of the housing 1 is connected to an unillustrated film transporting roll. Thus it is apparent that the film transporting means is operatively connected to the intermediate shaft 24 to be driven thereby.

At its right end, as viewed in FIG. 1, the second intermediate shaft 36 fixedly carries a helical pinion 39 which meshes with a helical gear 42 which is freely rotatable on the claw driving shaft 44. This gear 42 is connected to one end of a coil spring 43 coiled about a part of the shaft 44 and connected at its opposite end to a collar 45 which is fixed to the shaft 44, so that the rotation of the shaft 44 by the gear 42 takes place through the spring 43. The claw driving shaft also extends through and is rotatably carried by the front wall 8 of the projector. At its left end, as viewed in FIG. 2, the claw driving shaft 44 fixedly carries a flywheel 46, and at its right end which is located at the exterior of the housing, the claw driving shaft removably carries a pair of claw actuating cam means 47.

Figure 3:
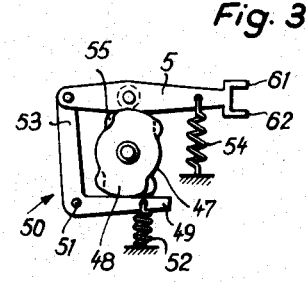
FIG. 3 is a partly diagrammatic illustration of a claw moving means according to the present invention.

This cam means 47 is also illustrated in FIG. 3. It is composed of a cam means 48 and a cam means 55. The cam 48 cooperates with a bell crank 50 which is turnable upon a pivot pin 51 fixedly carried by the wall 8 at the exterior thereof through any suitable supporting structure. A spring 52 is also carried by a suitable member fixed to the wall 8, and this spring 52 pushes upwardly on the substantially horizontal arm of the bell crank 50, as viewed in FIG. 3, so as to tend to turn the bell crank 50 in a counterclockwise direction, as viewed in FIG. 3, about the pivot pin 51. In this way the spring 52 maintains the bell crank 50 in engagement with the cam 48. The other arm 53 of the bell crank is pivotally connected to the claw 5. This claw 5 has a pair of side arms between which a roller is turnably supported, and this roller engages the other cam 55 of the pair of cams which form the claw moving means 47. A spring 54 connected to a member which is carried by the wall 8 pulls downwardly upon the claw 5, as viewed in FIG. 3, so as to maintain the roller of the claw 5 in engagement with the periphery of the cam 55.

Figure 4:
FIG. 4 illustrates a cam means which may be exchanged for a cam means shown in FIG. 3.

A screw 56 is screwed into the right end of the claw driving shaft 44, as viewed in FIG. 2, and serves to removably fix to the shaft 44 the claw actuating cam means 47. By removing the screw 56 it is possible to remove the pair of cam means 47 and to replace the same with another pair of cam means 57 which is illustrated in FIG. 4.

Each of the cams 48 and 55 of the cam means 47 is in the form of a cam having a pair of diametrically opposed camming portions which are angularly displaced from each other by 180°. The cam means 57, on the other hand, is made up of a pair of axially spaced cams each of which has a pair of opposed camming portions which are angularly displaced from each other by an angle of 144°.

The shutter driving shaft 18 fixedly carries the shutter 58 which has a pair of diametrically opposed arcuate projections 59 and 60, so that during each rotation of the shaft 18 the shutter 58 will obturate the aperture 6 twice.

As is apparent from FIG. 3, the claw 5 has a pair of claw teeth 61 and 62.

When the motor 11 is energized, then it rotates the shaft 15 through the pair of gears 13 and 14, and the rotation of the shaft 15 is transmitted by the gears 16 and 17 to the shutter driving shaft 18 so that the shutter 58 rotates in order to obturate the exposure aperture 6 twice during each revolution of the shaft 18. The shaft 18 transmits its rotation through the adjustable transmission means within the housing 19 to the intermediate shaft 24 which drives the plurality of film transporting structures described above. The flywheel 30 guarantees that all of the film transporting rolls rotate uniformly at the desired speeds.

The second intermediate shaft 36 is driven from the first intermediate shaft 24 by the cooperation of the gears 28 and 35, and in this way through the motion transmitting structure described above the claw driving shaft 44 is rotated so that the cam means 47 also rotates therewith. Thus, with the setting of the parts shown in FIG. 1 the claw driving shaft 44 will have a predetermined speed relationship to the speed of rotation of the shutter driving shaft 18.

During each rotation of the shaft 44 the cam 48 actuates the bell crank 50 twice so that the part 53 thereof actuates the claw 5 to move the latter into and out of engagement with the film strip. Thus, during each rotation of the shaft 44 the claw 5 will be twice moved out of engagement with the film strip and twice moved into engagement with the film strip by the cooperation of the cam 48 with the ball crank 50. The cam 55 actuates the claw 5 so as to move the latter to cause the film to be transported, and the film will be transported twice during each rotation of the shaft 44.

In the position of the parts shown in FIG. 1 the change gears 20 and 23 mesh with each other. The shutter drive shaft 18 and the claw drive shaft 44 thus have a predetermined speed relationship to each other. For example, if the motor 11 is connected to a power supply having a frequency of 50 cycles per second, then the gears 13 and 14 are designed to rotate the shaft 18 at a speed of 1500 revolutions per minute. The change gears 20 and 23 then produce a speed of rotation of the claw driving shaft 44 equal to 750 revolutions per minute, so that the claw driving shaft 44 rotates at one-half the speed of the shaft 18. Inasmuch as the film is shifted twice by the claw means during each revolution of the shaft 44, this will produce a film speed of 25 frames per second. The shutter 58 which rotates twice as fast as the shaft 44 obturates the exposure aperture 6 twice during the movement of each film frame.

If it is desired to move the film at a different speed while maintaining the same speed ratio between the shafts 18 and 44 and while still using the cam means 47, then it is only necessary to provide a different pair of gears 13 and 14 having different sizes. The reason for this is that the motor has its speed necessarily determined by the frequency of the power supply. Thus, if with a different set of gears 13 and 14 the shaft 18 is driven at a speed of 1440 rotations per minute, then the claw drive shaft 44 will rotate at 720 revolutions per minute and the film will move at a speed of 24 frames per second. If a set of gears 13 and 14 are used which provide a shutter speed of 1000 revolutions per minute then the film will move at a speed of 16⅔ frames per second. In this way it is possible to project conventional silent film, sound film, and narrow film such as 16 mm. or 8 mm. film.

A different speed relationship between the shutter drive shaft 18 and claw drive shaft 44 is required when the projector is set up to project 24 frames per second and when this projection is to be adapted for use in television with a scanning frequency of 60 cycles per second. In order to adjust the projector for this purpose a cover of the housing 19 is removed and the cross pins 20′, 22′ are removed and are reset after the change gears have been shifted so as to place the gears 21 and 22 in mesh with each other. After this adjustment is made the cover is replaced on the housing 19. Also, the shaft 18 is given a speed of 1800 revolutions per minute. Where the power supply has a frequency of 50 cycles per second, a speed of 1800 revolutions per minute is given to the shaft 18 by the use of a suitable pair of gears 13 and 14, or where the power supply has a frequency of 60 cycles per second it is possible to use the same gears 13 and 14 which provide the shaft 18 with a speed of 1500 revolutions per minute where the power frequency is 50 cycles per second. With the shaft 18 rotating at 1800 revolutions per minute, the gears 21 and 22 cooperate with each other to rotate the claw drive shaft 44 at a speed of 720 revolutions per minute. Instead of the cam means 47, the cam means 57 is used, this latter cam means being mounted on the shaft 44 in place of the cam means 47 in the manner described above.

With the projector thus adjusted, the shutter 58 will obturate the aperture 6 60 times per second. The cam means 57 will actuate the claw so that one film frame will remain in a projecting position during ⅖ of a revolution of the shaft 44 while the succeeding film frame will remain in the projecting position during ⅗ of the same revolution, so that in this way every other picture will be projected for ⅖ of a revolution of the shaft 44 while the remaining frames will be projected for a period of ⅗ of a revolution of the shaft 44.

Inasmuch as one revolution of the shaft 44 takes place during ½₂ or ⁵⁄₆₀ of a second, the time during which one film frame remains in the projecting position is equal to ²⁄₆₀ of a second while the time during which the succeeding film frame remains in the projecting position is ³⁄₆₀ of a second, and so on. The shutter obturates the aperture 6 twice while a film frame remains in the projecting position for ²⁄₆₀ of a second and three times while the succeeding film frame remains in the projecting position during ³⁄₆₀ of a second. The frames are scanned at a frequency of 60 times per second.

In order to use the projector for televising film with a scanning frequency of 50 cycles per second, it is only necessary to adjust the transmission within the housing 19 so that the gears 20 and 23 are again placed in mesh with each other, and the cam means 57 is removed and replaced by the cam means 47. Thus, with these simple changes requiring only the shifting of the gears within the projectors themselves and replacing of the cam means it is possible to use both types of television scanning.

As was pointed out above, the accommodation of the projector to power supply of different frequencies is brought about by providing different sets of gears 13 and 14. These gears together with the hollow carrier structure 10 may form a unit with the motor 11, so that when it is desired to adapt the projector to a certain frequency it is only necessary to replace one unit 10–14 with a different unit. When the carrier structure 10 which carries the motor 11 and which houses the gears 13 and 14 is connected to the housing 9 the clutch 16′ automatically places the two parts of the shaft 15 in driving engagement with each other.

The invention is not limited to the illustrated construction of the cams and claw and is capable of using any cam and claw construction which will shift the film through two film frames during each revolution of the claw driving shaft. It is important to provide an arrangement where the film is shifted through two film frames during each revolution of the claw driving shaft, since in this way it is possible to provide different projecting times for two successive film frames in a very simple way as described above.

It will be understood that each of the elements described above, or two or more together, may also find a useful application in other types of projectors differing from the types described above.

While the invention has been illustrated and described as embodied in adjustable projectors, it is not intended to be limited to the details shown, scince various modifications and structural changes may be made wihtout departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a film projector, in combination, a shutter drive shaft; a single claw drive shaft; claw means; means driven exclusively by said single claw drive shaft and co-operating with said claw means for moving the latter first into engagement with the film, then in a film advancing direction, and then out of engagement with the film; adjustable transmission means interconnecting said shutter drive shaft and said claw drive shaft with each other for simultaneous continuous rotation and for maintaining the speeds of rotation of said shutter drive shaft and claw drive shaft at a predetermined ratio with respect to each other which may be adjusted; said transmission means including a plurality of shiftable change gears which may be selectively placed in engagement with each other for adjusting the transmission ratio; and driving motor means of substantially constant speed operatively connected to one of said shafts for driving said one so as to rotate said shutter drive shaft and said claw drive shaft at speeds having a ratio with respect to each other determined by the setting of said adjustable transmission means.

2. In a film projector, in combination, support means; a shutter drive shaft rotatably carried by said support means; motor means having a substantially constant speed of operation operatively connected to said shutter drive shaft for rotating the latter; an intermediate shaft rotatably carried by said support means; transmission means interconnecting said intermediate shaft with said shutter drive shaft so that said intermediate shaft will rotate at a predetermined speed with respect to the speed of rotation of said shutter drive shaft, said transmission means including two pairs of change gears respectively mounted on said shutter drive shaft and said intermediate shaft for rotation therewith and shiftable along the axis of the respective shaft so as to be selectively placed in engagement with each other for adjusting the transmission ratio between shutter drive shaft and intermediate shaft; film transporting means operatively connected to said intermediate shaft to be driven thereby; a single claw drive shaft operatively connected to said intermediate shaft to be uniformly driven thereby; claw means; and means driven exclusively by said single claw drive shaft and co-operating with said claw means for moving the latter first into engagement with the film, then in a film advancing direction, and then out of engagement with the film.

3. In a film projector, in combination, support means; a shutter drive shaft rotatably carried by said support means; motor means having a substantially constant speed of operation operatively connected to said shutter drive shaft for rotating the latter; an intermediate shaft rotatably carried by said support means; transmission means interconnecting said intermediate shaft with said shutter drive shaft so that said intermediate shaft will rotate at a predetermined speed with respect to the speed of rotation of said shutter drive shaft, said transmission means including two pairs of change gears respectively mounted on said shutter drive shaft and said intermediate shaft for rotation therewith and shiftable along the axis of the respective shaft so as to be selectively placed in engagement with each other for adjusting the transmission ratio between shutter drive shaft and intermediate shaft; film transporting means operatively connected to said intermediate shaft to be driven thereby; a single claw drive shaft operatively connected to said intermediate shaft to be uniformly driven thereby; claw means; means driven exclusively by said single claw drive shaft and co-operating with said claw means for moving the latter first into engagement with the film, then in a film advancing direction, and then out of engagement with the film; and a flywheel carried by said intermediate shaft for rotation therewith.

4. In a film projector, in combination, support means; a shutter drive shaft rotatably carried by said support means; motor means having a substantially constant speed of operation operatively connected to said shutter drive shaft for rotating the latter; an intermediate shaft rotatably carried by said support means; transmission means interconnecting said intermediate shaft with said shutter drive shaft so that said intermediate shaft will rotate at a predetermined speed with respect to the speed of rotation of said shutter drive shaft, said transmission means including two pairs of change gears respectively mounted on said shutter drive shaft and said intermediate shaft for rotation therewith and shiftable along the axis of the respective shaft so as to be selectively placed in engagement with each other for adjusting the transmission ratio between shutter drive shaft and intermediate shaft; film transporting means operatively connected to said intermediate shaft to be driven thereby; claw drive shaft operatively connected to said intermediate shaft to be uniformly driven thereby; claw means; means driven exclusively by said single claw drive shaft and co-operating with said claw means for moving the latter first into engagement with the film, then in a film advancing direction, and then out of engagement with the film; and a housing having said adjustable transmission means located in its interior, said shutter drive shaft and said intermediate shaft each extending turnably through a pair of opposed walls of said housing.

5. In a film projector, in combination, support means; a shutter drive shaft rotatably carried by said support means; a first intermediate shaft rotatably carried by said support means; transmission means interconnecting said shutter drive shaft with said first intermediate shaft for rotating the latter with a speed which has a predetermined ratio to the speed of rotation of said shutter drive shaft, said transmission means including two pairs of change gears respectively mounted on said shutter drive shaft and said intermediate shaft for rotation therewith and shiftable along the axis of the respective shaft so as to be selectively placed in engagement with each other for adjusting the transmission ratio between shutter drive shaft and intermediate shaft; motor means operatively connected to said shutter drive shaft for rotating the latter, said motor means having a substantially constant speed of rotation; film transporting means operatively connected to said first intermediate shaft to be driven thereby; a second intermediate shaft; transmission means interconnecting said second intermediate shaft with said first intermediate shaft for rotating said second intermediate shaft when said first intermediate shaft rotates; a claw drive shaft; claw means; means driven exclusively by said claw drive shaft and cooperating with said claw means for moving the latter first into engagement with the film, then in a film advancing direction, and then out of engagement with the film; and transmission means interconnecting said second intermediate shaft with said claw drive shaft for uniformly rotating the latter when said second intermediate shaft rotates.

6. In a film projector, in combination, support means; a shutter drive shaft rotatably carried by said support means; a first intermediate shaft rotatably carried by said support means; transmission means interconnecting said shutter drive shaft with said first intermediate shaft for rotating the latter with a speed which has a predetermined ratio to the speed of rotation of said shutter drive shaft, said transmission means including two pairs of change gears respectively mounted on said shutter drive shaft and said intermediate shaft for rotation therewith and shiftable along the axis of the respective shaft so as to be selectively placed in engagement with each other for adjusting the transmission ratio between shutter drive shaft and intermediate shaft; motor means operatively connected to said shutter drive shaft for rotating the latter, said motor means having a substantially constant speed of rotation; film transporting means operatively connected to said first intermediate shaft to be driven thereby; a second intermediate shaft; transmission means interconnecting said second intermediate shaft with said first intermediate shaft for rotating said second intermediate shaft when said first intermediate shaft rotates; a claw drive shaft; claw means; means driven exclusively by said claw drive shaft and cooperating with said claw means for moving the latter first into engagement with the film, then in a film advancing direction, and then out of engagement with the film; transmission means interconnecting said second intermediate shaft with said claw drive shaft for uniformly rotating the latter when said second intermediate shaft rotates; and an additional film transporting means operatively connected to said second intermediate shaft to be driven by the latter.

7. In a film projector, in combination, shutter drive shaft means; claw drive shaft means; claw means; means driven exclusively by said claw drive shaft means and cooperating with said claw means for moving the latter first into engagement with the film, then in a film advancing direction, and then out of engagement with the film; transmission means interconnecting said shutter drive shaft means and said claw drive shaft means with each other for simultaneous continuous rotation and for maintaining the speeds of rotation of said shutter drive shaft means and claw drive shaft means at a predetermined ratio with respect to each other, said transmission means including a plurality of shiftable change gears which may be selectively placed in engagement with each other for adjusting the transmission ratio; driving motor means of substantially constant speed operatively connected to one of said means for driving said one means so as to rotate said shutter drive shaft means and said claw drive shaft means at speeds having a ratio with respect to each other determined by the setting of said adjustable transmission means; and a fly wheel carried by said claw drive shaft means.

8. In a film projector adapted to be used in the televising of film, in combination, shutter drive shaft means; claw drive shaft means; transmission means including a plurality of shiftable change gears which may be selectively placed in engagement with each other for interconnecting said claw drive shaft means with said shutter drive shaft means for simultaneous continuous rotation and for maintaining between the latter two shaft means an adjusted speed relationship which depends upon the relative position of said change gears with respect to each other; and claw moving means removably connected to said claw drive shaft means to be exchanged for a different claw moving means when the transmission means is adjusted, whereby one claw moving means may be used with one setting of transmission means when scanning of a first predetermined frequency is used and another claw moving means may be used with a different setting of said transmission means when a different predetermined scanning frequency is used.

References Cited in the file of this patent

UNITED STATES PATENTS

| | | |
|---|---|---|
| 2,087,250 | Foster | July 20, 1937 |
| 2,173,230 | Kellogg | Sept. 19, 1939 |
| 2,355,939 | Wurger | Aug. 15, 1944 |
| 2,390,389 | Redler | Dec. 4, 1945 |
| 2,447,839 | Bingley | Aug. 24, 1948 |
| 2,569,031 | Warner et al. | Sept. 25, 1951 |
| 2,712,771 | Isom | July 12, 1955 |
| 2,753,755 | Weissbrodt | July 10, 1956 |
| 2,845,840 | Jackson | Aug. 5, 1958 |

FOREIGN PATENTS

| | | |
|---|---|---|
| 690,487 | Great Britain | Apr. 22, 1953 |

OTHER REFERENCES

"Application of Motion Picture Film to Television," Engstrom, Journal of the Society of Motion Picture Engineers," vol. 33, pp. 3–17 (pp. 3–7 relied upon).